June 23, 1942.        L. HOPP ET AL        2,287,428
PRICE TICKET HOLDER
Filed Jan. 30, 1941
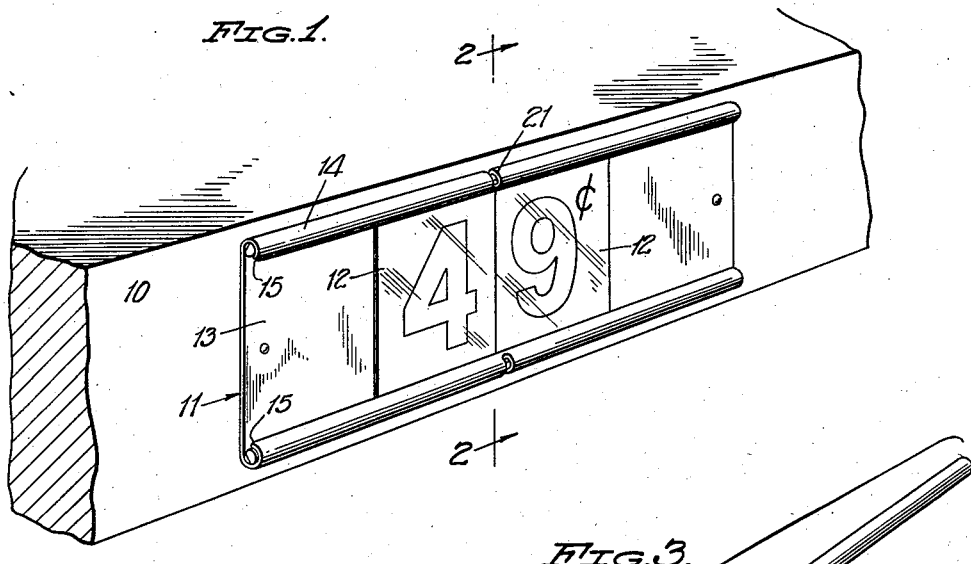
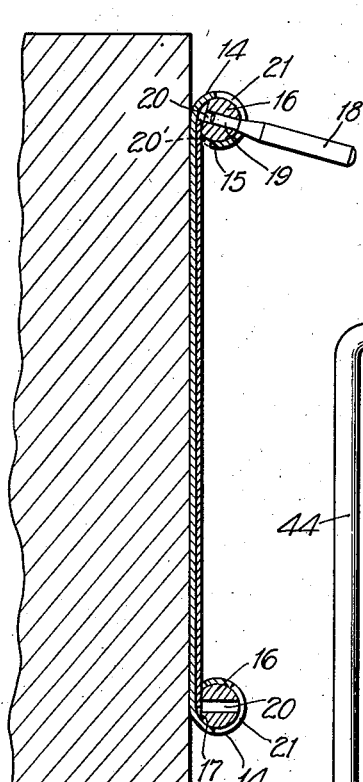
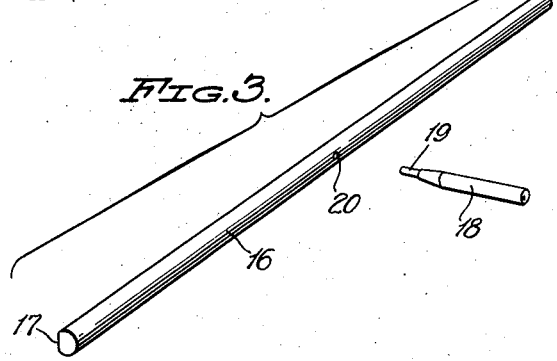
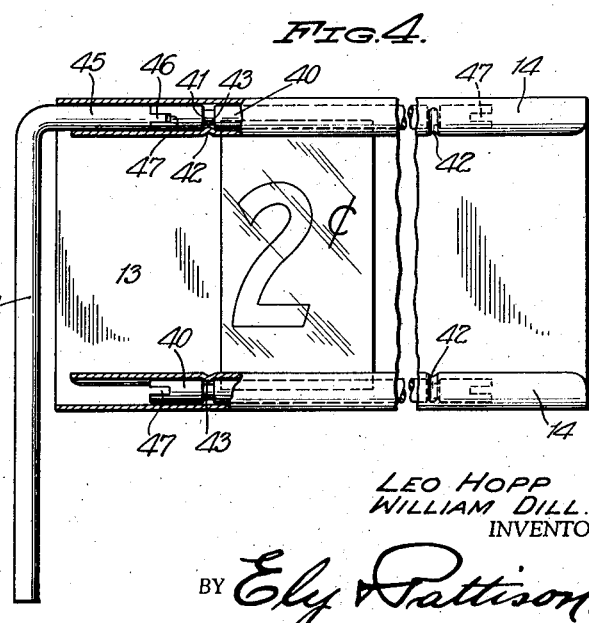
LEO HOPP
WILLIAM DILL.
INVENTORS.
BY Ely Pattison
ATTORNEYS.
WITNESS:

Patented June 23, 1942

2,287,428

UNITED STATES PATENT OFFICE 2,287,428

PRICE TICKET HOLDER

Leo Hopp, New York, N. Y., and William Dill, Newark, N. J., assignors to The Hopp Press, Incorporated, New York, N. Y., a corporation of New York Application January 30, 1941, Serial No. 376,560

4 Claims. (Cl. 40—17)

This invention relates to price ticket holders and more particularly it pertains to novel means for clamping or locking price tickets in their holders to prevent accidental or other disarrangement of the tickets.

In the accompanying drawing, the invention has been illustrated as embodied in a price ticket holder of the channel or molding type, but as will become apparent, it is not necessarily limited to holders of this type.

In modern stores, particularly of the self-service type, merchandise is displayed in readily accessible locations upon shelves, counters and the like and the prices are displayed by interchangeable price tickets carried by moldings mounted upon the edges of the shelves or in holders mounted upon the counters upon which the goods is displayed.

The accessibility of the price markers, together with the ease in which they may be so readily removed from their holders or carriers, tempts many unscrupulous persons to shift the relative positions of the price tickets in order to display a lower unit price for the goods with which the price markers are associated and then insist upon purchasing the goods at the lower unit price.

It is the object of the present invention to provide a price ticket holder in which the price tickets may be securely clamped or locked against tampering by unauthorized parties.

A feature of the invention resides in the provision of means for clamping the price tickets in their holders in such a manner as to prevent their removal therefrom except by persons authorized so to do.

In the accompanying drawing, the invention is illustrated as embodied in a price ticket holder of the shelf molding type and in said drawing:

Figure 1 is a fragmentary perspective view of a shelf with a price ticket holder constructed in accordance with the present invention secured to the forward edge thereof, Figure 2 is a transverse sectional view on an enlarged scale taken substantially on the line 2—2 of Figure 1, Figure 3 is a distended perspective view, and;

Figure 4 is a view in elevation partly broken away of a modified form of the invention.

Referring to the drawing by reference character, 10 designates a store shelf or similar structure and 11 designates a price ticket holder, the tickets being designated 12.

The price ticket holder 11 is of the molding type and comprises a main body portion 13 and retaining flanges 14 extending along two opposite side edges of the main body portion.

The price ticket holder is formed from metal and the retaining flanges 14 are preferably formed by rolling inwardly the side edges of the main body portion, leaving the inner edges 15 of the retaining flanges free. When formed in this manner, the retaining flanges are possessed of a certain degree of resiliency, the purpose of which will hereinafter appear.

The price tickets 12 are carried by the holder, their ends lying beneath the retaining flanges as best illustrated in Figure 2 of the drawing.

Means is provided to clamp the price tickets 12 in the holder against movement relative thereto and this means will now be described.

Mounted in each of the retaining flanges 14 and extending preferably throughout the length of the holder, there is a rod or bar 16. The rods or bars 16 are substantially circular in cross section except for the fact that each has a relatively narrow flat face 17 which preferably extends throughout the major portion at least of the length of the rod or bar.

Each rod or bar is rotatably mounted in its respective retaining flange and in that form of the invention illustrated in Figures 1 through 3, rotation of the rods or bars is effected by means of a pin or the like 18.

The pin 18 has a tapered extremity 19 for reception in a recess or opening 20 in each rod or bar, and each of the retaining flanges 14 is cut out as at 21 at points to register with the recesses or openings 20 in the rods or bars 16 to permit of insertion of the tapered end 19 of the pin 18 into the recesses or openings 20 as illustrated in Figure 2 of the drawing.

In Figure 2 of the drawing, the rods or bars 16 are illustrated one in the holding position and the other in the releasing position, the upper rod or bar being in the holding position, while the lower rod or bar is illustrated in the releasing position.

With both rods or bars in the releasing position, that is with their flat faces 17 disposed in a plane parallel with the plane of the main body portion of the holder as illustrated at the bottom of Figure 2, the price tickets 12 may be freely inserted and moved to any desired position in the holder.

After the price tickets have been moved to their desired positions, they are secured against movement, either accidental or otherwise, by rotating the rods or bars 16 in their respective flanges 14 by means of the pin 18 in the heretofore described manner.

As the rods or bars are rotated from the position shown at the bottom of Figure 2 to that in which they are shown at the top of said figure, the side edges of the flat faces 17 engage or bite upon the price tickets, securely clamping them against the main body portion of the holder 11.

As the edges of the flat faces 17 of the rods or bars engage the price tickets, a camming action takes place which places the retaining flanges under tension by distorting them as indicated by the dotted lines at 20' in Figure 2. This tension will be sufficient to retain the rods or bars in their clamping positions and to cause them to grip the price tickets with sufficient pressure to prevent movement thereof until the rods or bars have been moved to their releasing position.

In that form of the invention illustrated in Figure 4, the rods or bars are designated 40. It will be noted that these rods or bars are shorter than the main body portion 13 of the holder, their outer free ends terminating at points within the flanges 14. In this form of the invention, the rods or bars 40 are provided with annular grooves or channels 41 near each end and the retaining flanges 14 are indented as at 42 to provide projections 43 which lie in the annular grooves or channels 41. By this construction, the rods or bars 40 are retained against longitudinal movement in the retaining flanges 14 and at the same time have free rotary movement therein.

The rods or bars are rotated in this form of the invention by means of a key 44 having an angularly disposed end 45 which is provided with a reduced portion 46 for reception in a slot or the like 47 in the free ends of the rods or bars 40. In this form the rods or bars 40 are shown as provided with slots 47 upon each end, but obviously they could be formed with a slot in one end only.

To rotate the rods or bars, the angularly disposed end 45 of the key 44 may be inserted into the retaining flange and rotated until its reduced portion 46 engages in the slot 47 in the end of the rod or bar. If now, the key 44 be rotated, the rod or bar will likewise be rotated either to release a price ticket or tickets held thereby or to secure a price ticket or tickets in the holder.

The construction illustrated in Figure 4 makes it impossible to rotate the rods or bars except by the use of a specially designed key thereby excluding all unauthorized tampering with the holder.

From the foregoing, it will be apparent that the present invention provides a new and improved price ticket holder in which the price tickets may be securely clamped in position with the assurance that they will not become displaced either accidentaly or otherwise.

The invention has been herein illustrated as embodying a price ticket clamping means associated with each of the ticket retaining flanges. It is to be understood, however, that the invention is not to be limited to this construction, since ticket clamping means associated with one only of the ticket retaining flanges will, under certain conditions, suffice to secure the tickets within the holder.

Having thus described the invention what is claimed as new, is:

1. A price ticket holder comprising a main body portion, resilient retaining flanges extending along opposite side edges of the main body portion, and means rotatably mounted in one of the retaining flanges for releasably clamping a price ticket in position in the holder, said means being retained in ticket clamping position through the medium of the resiliency of the retaining flange by which it is carried, and means for rotating said rotatable clamping means.

2. A price ticket holder comprising a main body portion, resilient retaining flanges extending along opposite edges of the main body portion, and ticket clamping means carried by one of the resilient retaining flanges, said clamping means comprising a rigid bar enclosed within the retaining flange and rotatable therein to positions to clamp and release a ticket mounted in the holder, and means for rotating said rigid bar within the retaining flange.

3. A price ticket holder comprising a main body portion, resilient retaining flanges extending along opposite edges of the main body portion, and ticket clamping means carried by the resilient retaining flanges, said clamping means comprising a rigid bar rotatably mounted in each of said resilient retaining flanges, and means for rotating said clamping means within the retaining flanges.

4. A price ticket holder comprising a main body portion, resilient retaining flanges extending along opposite edges of the main body portion, and ticket clamping means carried by the resilient retaining flanges, said clamping means comprising a rigid bar rotatably mounted in each of the retaining flanges, the bar having a flat peripheral face which when the bar is rotated in one direction moves into parallelism with the adjacent face of a ticket carried in the holder to release the ticket, and which moves out of parallelism with the adjacent face of a ticket carried in the holder to place the retaining flange under tension and to thereby clamp a ticket in position in the holder, and means for rotating said rigid bar in the retaining flange.

LEO HOPP.
WILLIAM DILL.